(12) United States Patent
Gaubil et al.

(10) Patent No.: US 10,584,065 B2
(45) Date of Patent: Mar. 10, 2020

(54) REFRACTORY BLOCK AND GLASS-MELTING FURNACE

(71) Applicants: SAINT GOBAIN CENTRE DE RECHERCHES ET D'ETUDES EUROPEEN, Courbevoie (FR); CENTRE NATIONAL DE LA RECHERCHE SCIENTIFIQUE, Paris (FR)

(72) Inventors: Michel Gaubil, Les Angles (FR); Benjamin Bouvry, Courbevoie (FR); Olivier Citti, Courbevoie (FR); David Lechevalier, Courbevoie (FR)

(73) Assignees: SAINT GOBAIN CENTRE DE RECHERCHES ET D'ETUDES EUROPEEN, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 217 days.

(21) Appl. No.: 15/552,914

(22) PCT Filed: Feb. 23, 2016

(86) PCT No.: PCT/EP2016/053784
§ 371 (c)(1),
(2) Date: Aug. 23, 2017

(87) PCT Pub. No.: WO2016/135147
PCT Pub. Date: Sep. 1, 2016

(65) Prior Publication Data
US 2018/0044241 A1   Feb. 15, 2018

(51) Int. Cl.
| | | |
|---|---|---|
| *C04B 35/107* | (2006.01) | |
| *C03B 5/43* | (2006.01) | |
| *F27D 1/00* | (2006.01) | |
| *C04B 35/101* | (2006.01) | |
| *C04B 35/657* | (2006.01) | |

(52) U.S. Cl.
CPC .............. *C04B 35/107* (2013.01); *C03B 5/43* (2013.01); *C04B 35/101* (2013.01); *C04B 35/657* (2013.01); *F27D 1/0006* (2013.01); *C04B 2235/3201* (2013.01); *C04B 2235/3208* (2013.01); *C04B 2235/3213* (2013.01); *C04B 2235/3215* (2013.01); *C04B 2235/3232* (2013.01); *C04B 2235/3272* (2013.01); *C04B 2235/3418* (2013.01); *C04B 2235/72* (2013.01); *C04B 2235/725* (2013.01)

(58) Field of Classification Search
CPC ................................ C04B 35/107; C03B 5/43
See application file for complete search history.

(56) References Cited

U.S. PATENT DOCUMENTS

| | | | | |
|---|---|---|---|---|
| 5,733,830 A | * | 3/1998 | Endo ......................... | C03B 5/43 110/338 |
| 2002/0103070 A1 | * | 8/2002 | Toshihiro ................. | C03B 5/43 501/84 |
| 2012/0263929 A1 | * | 10/2012 | Citti ...................... | C03B 17/064 428/212 |
| 2013/0217563 A1 | * | 8/2013 | Citti ...................... | C04B 35/111 501/96.3 |

FOREIGN PATENT DOCUMENTS

| | | |
|---|---|---|
| EP | 1288177 A1 | 3/2003 |
| JP | H10218676 A | 8/1998 |

OTHER PUBLICATIONS

Corresponding International application, application No. PCT/EP2016/053784, International Search Report dated May 17, 2016, 2 pages.

* cited by examiner

*Primary Examiner* — Karl E Group
(74) *Attorney, Agent, or Firm* — Cooper Legal Group, LLC; Ronald M. Kachmarik

(57) ABSTRACT

A molten refractory product having the following average chemical composition, in wt % on the basis of oxides and for a total of 100%: $Al_2O_3$: balance to 100%; $Fe_2O_3$: 0.6%-5.0% and/or $TiO_2$: 1.5%-10.0%; $Fe_2O_3+TiO_2 \leq 10.0\%$; $Na_2O+K_2O$: 1.0%-8.0%; $SiO_2$: 0.2%-2.0%; $CaO+BaO+SrO$: $\leq 0.5\%$; Other oxide species: $\leq 1.5\%$. Also, a glass-melting furnace and the use of the refractory product in the glass-melting furnace.

11 Claims, No Drawings

REFRACTORY BLOCK AND GLASS-MELTING FURNACE

TECHNICAL FIELD

The invention relates to a molten refractory product having a high alumina content, which is suitable most particularly for the production of superstructures of glassmaking furnaces.

PRIOR ART

Among refractory products, a distinction is made between molten products, well known for the construction of glass-melting furnaces, and sintered products.

Unlike sintered products, molten products usually comprise an intergranular vitreous phase connecting crystallized grains. The problems posed by sintered products and by molten products, and the technical solutions adopted for solving them, are thus generally different. A composition developed for manufacturing a sintered product is not therefore, a priori, usable as such for manufacturing a molten product, and vice versa.

Molten products, often referred to as "electrocast" products, are obtained by melting a mixture of appropriate raw materials in an electric arc furnace or by any other technique suitable for these products. The bath of molten material is then cast in a mold and the product obtained then undergoes a controlled cooling cycle.

Among the molten products, electrocast products with a high content of alumina ($Al_2O_3$) have been known for several tens of years. They are divided up into two major families, depending on the crystallographic composition: products consisting essentially of β-alumina and products consisting of a mixture of α-alumina (or "corundum") and β-alumina are distinguished.

U.S. Pat. No. 2,043,029 describes materials containing 1-10% sodium oxide and essentially formed from β-alumina.

JP10-218676 describes products of β-alumina comprising, as weight percentages, 85% to 95% of $Al_2O_3$, from 4.0% to 7.5% of $Na_2O+K_2O$, from 0.2% to 2.0% of MgO, from 0.2% to 3.0% of $CaO+SrO+BaO$, less than 0.5% of $SiO_2$ and less than 0.1% of $Fe_2O_3+TiO_2$.

EP 1 288 177 describes products with a high content of alumina which are intended for use in a superstructure of glassmaking ovens and consist of a mixture of α-alumina and β-alumina and have a porosity of between 7% and 25%.

In practice, all the commercially available materials consisting mainly of β-alumina, such as Monofrax H, SCIMOS H or Jargal H have, upon analysis, very similar compositions, namely from 92% to 94% by weight of $Al_2O_3$, from 5% to 7% of $Na_2O$ and less than 0.5% of silica and of other oxides. All these products are virtually free of α-alumina (less than 3-4% and typically at most 2% in Jargal H).

In practice, all the commercially available α/β-alumina materials, such as Monofrax M, SCIMOS M or Jargal M have, upon analysis, very similar compositions, namely from 94% to 95% by weight of $Al_2O_3$, approximately 4% of $Na_2O$ and from 0.5% to 1% of silica and less than 0.5% of other oxides. All these products have an α-alumina content of from 40% to 45% and a β-alumina content of from 50% to 60%.

The β-alumina materials have a high heat-shock resistance and also a high hot mechanical stress resistance and a low thermal conductivity. These properties make them very suitable for use in a superstructure (for forming the crown) in glass-melting furnaces (glassmaking furnaces).

In furnaces where the raw materials constituting the glass are melted by means of flame burners, there is a constant need to improve the energy efficiency.

The present invention aims to meet this need.

SUMMARY OF THE INVENTION

More particularly, it relates to a molten refractory product having the following average chemical composition, as weight percentages on the basis of oxides and for a total of 100%:

$Al_2O_3$: balance to 100%;
$Fe_2O_3$: 0.6%-5.0% and/or $TiO_2$: 1.5%-10.0%, provided that $Fe_2O_3+TiO_2 \leq 10.0\%$;
$Na_2O+K_2O$: 1.0%-8.0%;
$SiO_2$: 0.2%-2.0%;
$CaO+BaO+SrO$: ≤0.5%;
oxide species other than $Al_2O_3$, $Fe_2O_3$, $TiO_2$, $Na_2O$, $K_2O$, $SiO_2$, CaO, BaO and SrO: ≤1.5%.

Surprisingly, the inventors have noted that this composition gives the product an improved emissive capacity in the wavelengths corresponding to the temperatures of the burner flames. The refractory product thus exhibits better release of the energy from the flames.

Advantageously, this results in a higher energy efficiency.

A product according to the invention may also comprise one or more of the following optional characteristics:
- $Al_2O_3 \geq 90\%$, or even $Al_2O_3 \geq 92\%$;
- The content of iron oxide $Fe_2O_3$ is greater than or equal to 1.0%, or even greater than or equal to 1.2%, or even greater than or equal to 1.5%, and/or less than or equal to 4.5%, or even less than or equal to 4.0%, or even less than or equal to 3.5%, or even less than or equal to 3.0%;
- The content of titanium oxide $TiO_2$ is greater than or equal to 1.7%, or even greater than or equal to 2.0%, or even greater than or equal to 2.5%, or even greater than or equal to 3.0%, and/or less than or equal to 9.0%, or even less than or equal to 8.0%, or even less than or equal to 7.0%, or even less than or equal to 6.0%, or even less than or equal to 5.0%;
- The content of titanium oxide $TiO_2$, in the presence of more than 0.6% of iron oxide $Fe_2O_3$, is greater than or equal to 1.0%, or even greater than or equal to 1.2%, or even greater than or equal to 1.5%, or even greater than or equal to 2.0%, and/or less than or equal to 8.0%, or even less than or equal to 7.0%, or even less than or equal to 6.0%, or even less than or equal to 5.0%, or even less than or equal to 4.0%;
- The content of $Fe_2O_3+TiO_2$ is greater than 1.0%, or even greater than or equal to 1.2%, or even greater than or equal to 1.5%, or even greater than or equal to 2.0%, and/or less than or equal to 9.0%, or even less than or equal to 8.0%, or even less than or equal to 7.0%, or even less than or equal to 6.0%, or even less than or equal to 5.0%, or even less than or equal to 4.0%;
- The content of $Na_2O+K_2O$ is greater than or equal to 1.5%, or even greater than or equal to 2.0%, or even greater than or equal to 2.5%, or even greater than or equal to 3.0%, or even greater than or equal to 3.5%, and/or less than or equal to 7.5%, or even less than or equal to 7.0%;
- The content of $SiO_2$ is greater than or equal to 0.3%, or even greater than or equal to 0.5%, and/or less than or equal to 1.5%, or even less than or equal to 1.2%, or even less than or equal to 1.0%, or even less than or equal to 0.9%;

The "other oxide species" are impurities;

The content of $ZrO_2$ is less than 1.0%, preferably less than 0.8%, preferably less than 0.5%;

The product is in the form of a block preferably having a weight greater than 10 kg.

According to one embodiment, the invention relates to a molten refractory product having the following average chemical composition, as weight percentages on the basis of oxides and for a total of 100%:

$Al_2O_3$: balance to 100%;
$TiO_2$: 2.0%-5.0%;
$Fe_2O_3+TiO_2$: ≤6.0%;
$Na_2O+K_2O$: 1.0%-8.0%;
$SiO_2$: 0.3%-1.5%;
$CaO+BaO+SrO$: ≤0.5%;
oxide species other than $Al_2O_3$, $Fe_2O_3$, $TiO_2$, $Na_2O$, $K_2O$, $SiO_2$, CaO, BaO and SrO: ≤1.5%.

According to another embodiment, the invention relates to a molten refractory product having the following average chemical composition, as weight percentages on the basis of oxides and for a total of 100%:

$Al_2O_3$: balance to 100%;
$Fe_2O_3$: 1.0%-3.0% and $TiO_2$: 1.0%-4.0%;
$Fe_2O_3+TiO_2$: ≤6.0%;
$Na_2O+K_2O$: 1.0%-8.0%;
$SiO_2$: 0.3%-1.5%;
$CaO+BaO+SrO$: ≤0.5%;
oxide species other than $Al_2O_3$, $Fe_2O_3$, $TiO_2$, $Na_2O$, $K_2O$, $SiO_2$, CaO, BaO and SrO: ≤1.5%.

The invention also relates to a process for manufacturing a refractory product according to the invention, comprising the following successive steps:

a) mixing raw materials, so as to form a starting feedstock,
b) melting said starting feedstock until a bath of molten material is obtained,
c) casting and solidifying said molten material, by controlled cooling, so as to obtain a molten refractory product, this process being notable in that said raw materials are chosen such that said molten refractory product has a composition in accordance with that of a product according to the invention.

Finally, the invention relates to a glass-melting furnace comprising a product according to the invention, in particular a product manufactured or capable of having been manufactured by means of a process according to the invention, in particular as a superstructure (crown) of the furnace.

DEFINITIONS

In general, the term "molten product", "molten and cast product" or "obtained by melting" refers to a solid, optionally annealed, product obtained by complete solidification, by cooling, of a bath of molten material. A "bath of molten material" is a mass which, in order to preserve its shape, must be contained in a container. A bath of molten material, which appears to be liquid, may contain solid parts, but in an amount that is insufficient for them to be able to structure said mass.

A product according to the invention may contain hafnium oxide, $HfO_2$, naturally present in zirconium oxide sources. Its weight content in the product according to the invention is less than or equal to 5%, generally less than or equal to 2%. The term "$ZrO_2$" conventionally denotes zirconium oxide and these traces of hafnium oxide. $HfO_2$ is not therefore included in the "other oxide species".

The term "impurities" is intended to mean the unavoidable constituents, necessarily introduced with the raw materials or resulting from reactions with these constituents.

Unless otherwise mentioned, all the percentages of the present description are weight percentages on the basis of oxides.

DETAILED DESCRIPTION

In a molten and cast product according to the invention, the presence of iron, expressed in the $Fe_2O_3$ form, and/or titanium oxide, expressed in the $TiO_2$ form, in contents according to the invention, makes it possible, in combination with the other constituents, to obtain a refractory product which is particularly suitable for being used as a glass-melting furnace crown. However, at contents that are too high, the presence of these oxides may be harmful to the hot mechanical properties (in particular the creep) of the products. Their content must thus be limited.

The presence of the alkaline metal oxides $Na_2O$ and $K_2O$ makes it possible to ensure the feasibility, in particular of products in the form of blocks of large dimensions.

In one embodiment, the oxide species other than $Al_2O_3$, $Fe_2O_3$, $TiO_2$, $Na_2O$, $K_2O$, $SiO_2$, CaO, BaO and SrO are limited to species of which the presence is not particularly desired and which are generally present by way of impurities in the raw materials.

The presence of these oxide species other than $Al_2O_3$, $Fe_2O_3$, $TiO_2$, $Na_2O$, $K_2O$, $SiO_2$. CaO, BaO and SrO does not substantially modify the results obtained, provided that their content remains less than 1.5%.

Conventionally, in a molten and cast product, the oxides represent more than 98.5%, more than 99%, or even approximately 100% of the weight of the product. The same is true in a product according to the invention.

Any conventional process for manufacturing alumina-based molten products intended for applications in glass-melting furnaces may be carried out, provided that the composition of the starting feedstock makes it possible to obtain products having a composition in accordance with that of a product according to the invention.

In particular, a product according to the invention may be manufactured according to steps a) to c) described above.

In step a), the raw materials are determined so as to guarantee a composition, in the final product, in accordance with the invention.

In step b), the melting is preferably carried out by means of the combined action of quite a long electric arc, not producing any reduction, and of stirring which promotes reoxidization of the products.

In order to minimize the formation of nodules with a metallic aspect and to avoid the formation of slots or splits in the final product, it is preferable to carry out the melting under oxidizing conditions.

Preferentially, the long arc melting process described in French patent No. 1 208 577 and its additions Nos. 75893 and 82310.

This process consists in using an electric arc furnace of which the arc flies out between the feedstock and at least one electrode which is at a distance from this feedstock and in regulating the length of the arc so that its reductive action is reduced to a minimum, while at the same time maintaining an oxidizing atmosphere above the molten bath and stirring said bath, either by the action of the arc itself, or by bubbling an oxidizing gas (air or oxygen, for example) into the bath or else by adding to the bath oxygen-releasing substances such as peroxides.

In step c), the bath of molten material is preferably cast in a mold that is suitable for the manufacture of a block. The cooling is preferably carried out at a speed of approximately 10° C. per hour.

Any conventional process for manufacturing high-alumina molten products intended for applications in glass-melting furnaces may be carried out, provided that the composition of the starting feedstock makes it possible to obtain products having a composition in accordance with that of a product according to the invention.

A product according to the invention may constitute all or part of a block.

In particular, it may constitute only one region (for example a superficial layer having a thickness of less than 50 mm, less than 40 mm, less than 30 mm, for example of approximately 20 millimeters), in particular a region which is exposed to flame radiation.

The shape of the block is not limiting.

The block may have at least one dimension (thickness, length or width) of at least 150 mm, preferably of at least 200 mm, or even of at least 400 mm, or even of at least 600 mm, or even of at least 800 mm or even of at least 1000 mm, or even more of at least 1600 mm.

In one advantageous embodiment, the thickness, the length and the width of the block are at least 150 mm, or even at least 200 mm, or even at least 300 mm, or even at least 400 mm.

Preferably, the block is part of or constitutes the superstructure (crown) of a furnace, in particular of a glass-melting furnace.

EXAMPLES

The following nonlimiting examples are given for the purpose of illustrating the invention. In these examples, the following raw materials were used:
 alumina type AC44 sold by the company Pechiney and containing on average 99.4% of $Al_2O_3$,
 sodium carbonate containing 58.5% of $Na_2O$,
 iron oxide having a purity greater than 99%,
 titanium oxide (rutile) having a purity greater than 99%.

The products were prepared according to the conventional arc furnace melting process, then cast so as to obtain blocks of 200×200×200 $mm^3$ format.

The chemical analysis of the products obtained is given in table 1; it is an average chemical analysis, given as percentage by weight. The impurities constitute the balance to 100%.

Evaluation of Emissivity

The device uses two Fourier transform infrared spectrometers manufactured by Bruker (Vertex 80 v and Vertex 70) which make it possible to carry out measurements of emission in the spectral range of from 1000 to 16 000 $cm^{-1}$.

The samples have a thickness of approximately 4 mm and the typical diameter of the zone analyzed on the sample is 2 mm. The samples are heated by means of a $CO_2$ laser (Diamond K500, Coherent Inc.). The beam follows a path which goes through a separator and a set of mirrors making it possible to perform identical heating of the two faces of the sample. Simultaneous measurements were carried out by the two spectrometers of the fluxes emitted by the sample and by the black substance (Pyrox PY8 furnace, having a cylindrical cavity of lanthanum chromite $LaCrO_3$), pierced with a lateral orifice, the latter having an emissivity equal to 1. The infrared spectrometers are also used as pyrometers for measuring the temperature of the sample. The method used is the Christiansen point method.

Table 1 gives the Em value: mean emissivities measured at 1600° C., between 4000 and 14 000 $cm^{-1}$. Em is considered to be significantly improved when the value is 2 times higher or more than the value obtained for the reference product (example 1).

The balance to 100% is made up of impurities.

TABLE 1

| No. | $Al_2O_3$ | $Na_2O$ | $SiO_2$ | $Fe_2O_3$ | $TiO_2$ | Em |
|---|---|---|---|---|---|---|
| 1 | 95.0 | 3.5 | 0.7 | <0.1 | <0.01 | 0.18 |
| 2 | 95.0 | 3.4 | 0.5 | 0.1 | <0.01 | 0.3 |
| 3 | 94.8 | 3.4 | 0.6 | 0.3 | <0.01 | 0.35 |
| 4 | 95.0 | 3.5 | 0.5 | 0.8 | <0.01 | 0.55 |
| 5 | 94.0 | 3.4 | 0.7 | 1.4 | <0.01 | 0.6 |
| 6 | 92.0 | 3.3 | 0.7 | 2.6 | <0.01 | 0.82 |
| 7 | 91.6 | 3.8 | 0.8 | 2.2 | 1.6 | 0.7 |
| 8 | 91.9 | 3.9 | 0.7 | 1.6 | 1.9 | 0.68 |
| 9 | 91.0 | 3.2 | 0.7 | 0.9 | 3.5 | 0.75 |
| 10 | 88.0 | 1.7 | 0.6 | 0.5 | 8.9 | 0.84 |
| 11 | 93.3 | 3.7 | 0.6 | 0.0 | 1.8 | 0.45 |
| 12 | 92.4 | 3.3 | 0.6 | 0.1 | 3.4 | 0.57 |
| 13 | 88.0 | 2.1 | 0.6 | 0.1 | 8.4 | 0.7 |

The examples of the invention show, in comparison with reference example 1, that the mean emissivity, in the range of wavelengths of between 4000 and 14 000 $cm^{-1}$, may be improved by virtue of the presence of more than 0.6% of iron oxide and/or of 1.5% of titanium oxide.

Of course, the present invention is not limited to the described embodiments provided by way of illustrative and nonlimiting examples.

In particular, the products according to the invention are not limited to particular forms or dimensions, nor to the application to the glassmaking furnaces.

The invention claimed is:

1. A molten refractory product having the following average chemical composition, as weight percentages on the basis of oxides and for a total of 100%:
 $Al_2O_3$: balance to 100%;
 $Fe_2O_3$: 0.6%-5.0% and/or $TiO_2$: 1.5%-10.0%;
 provided that $Fe_2O_3+TiO_2 \leq 10.0\%$;
 $Na_2O+K_2O$: 1.0%-8.0%;
 $SiO_2$: 0.2%-2.0%;
 $CaO+BaO+SrO$: $\leq 0.5\%$;
 oxide species other than $Al_2O_3$, $Fe_2O_3$, $TiO_2$, $Na_2O$, $K_2O$, $SiO_2$, CaO, BaO and SrO: $\leq 1.5\%$.

2. The product as claimed in claim 1, wherein the content of $Fe_2O_3+TiO_2$ is less than or equal to 8.0%.

3. The product as claimed in claim 1, wherein the content of $Fe_2O_3$ is less than or equal to 3.0%.

4. The product as claimed in claim 1, wherein the content of $TiO_2$ is less than or equal to 6.0%.

5. The product as claimed in claim 1, wherein the content of $TiO_2$ is between 2.5%-5.0% and the content of $Fe_2O_3+TiO_2$ is between 2.5%-6.0%.

6. The product as claimed in claim 1, wherein the content of $Fe_2O_3$ is between 1.0%-3.0% and the content of $TiO_2$ is between 2.0%-4.0%.

7. The product as claimed in claim 1, wherein the content of $SiO_2$ is less than or equal to 1.0%.

8. The product as claimed in claim 1, wherein the content of $Na_2O+K_2O$ is less than or equal to 7.0%.

9. The product as claimed in claim 1, which is in the form of a block having a weight of more than 10 kg.

10. A glass-melting furnace, comprising a product as claimed in claim 1.

11. The furnace as claimed in claim 10, wherein said product is arranged in a superstructure.

* * * * *